United States Patent [19]

Neece

[11] Patent Number: 4,893,226
[45] Date of Patent: Jan. 9, 1990

[54] ADJUSTABLE LENS SHIELD ASSEMBLY FOR VEHICULAR LIGHTS

[76] Inventor: Roy M. Neece, 9436 Tranquil Acres Rd., Saginaw, Tex. 76179

[21] Appl. No.: 300,326

[22] Filed: Jan. 23, 1989

[51] Int. Cl.$^4$ ............................................. F21V 15/00
[52] U.S. Cl. ..................................... 362/376; 362/61; 362/82; 362/293; 293/117
[58] Field of Search .................... 293/117; 362/61, 80, 362/82, 83, 293, 311, 351, 376

[56] References Cited

U.S. PATENT DOCUMENTS

| | | | |
|---|---|---|---|
| 3,696,238 | 10/1972 | Szymanski | 362/293 |
| 4,538,213 | 8/1985 | Martin | 362/61 |
| 4,556,931 | 12/1985 | Wheatley | 362/61 |

*Primary Examiner*—Stephen F. Husar
*Attorney, Agent, or Firm*—Charles W. McHugh

[57] ABSTRACT

A lens shield assembly and method for protecting recessed vehicular lights, such as the type mounted behind a cutout in an automotive body, from gravel, stone, and other roadway debris. The assembly includes an essentially transparent protective plate that is positionable against an outer vehicle surface (such as a bumper or fender) to cover a cutout behind which a light is recessed. A first retaining member is attachable or fixedly secured to the plate outer region and positioned through the opening in the vehicle surface to secure the plate to the vehicle surface. A clip attaches to an outer region of the plate for sliding engagement along an opening in the plate, and can be positioned against a portion of the vehicle surface which borders the cutout so as to clamp the vehicle surface between the plate and the clip. A fastener such as a screw through the plate opening for coupling the plate to the clip. According to the method, the plate is positioned over the cutout so that the retaining member and clip each extend into the vehicle body member along the border of the cutout. With the retaining member positioned against a first edge portion of the cutout, the clip is moved along the plate opening against a second edge portion of the cutout and clamped against it in order to secure the plate against the vehicle body member. If desired, both the retaining member and the clip can be identically and manipulated to secure the plate to the vehicle. The plate may be clear or colored.

25 Claims, 2 Drawing Sheets

ADJUSTABLE LENS SHIELD ASSEMBLY FOR VEHICULAR LIGHTS

BACKGROUND OF THE INVENTION

This invention relates generally to protective guards for exterior vehicular lighting; more specifically, it relates to an assembly and a method for protecting recessed vehicle lights from impact with roadway debris such as stones, gravel, and broken glass, said debris being of the type that is occasionally thrown into the air by a moving vehicle.

It is well known that exterior vehicular lighting is subject to breakage from flying debris when a vehicle is traveling along a road or highway. One of the most common forms of debris is the material which is picked up by the tandem wheels of a truck and figuratively "thrown" at a following vehicle. Another common form of debris is the material that falls off the open beds of trucks that are hauling construction materials such as gravel, crushed rock, fill dirt, etc. And coal, trash, chunks of ice and other things that are not tied down are always subject to falling out of or off trucks, where they become equivalent to missiles when they strike lenses and lamps on other vehicles. Even if these "missiles" do not cause the breakage of any glass that is associated with vehicular lighting, they can cause such scratching and pitting on the exterior surface of a glass lens as to eventually interfere with the projection of light in front of a vehicle.

Of course, it is also well known to try to protect the lights on a vehicle by placing a grill, screen, or transparent cover over the lights. An early example of a wire grill is shown in a 1916 U.S. patent (U.S. Pat. No. 1,187,968) to Cherry entitled "Combined Headlight Guard and Dimmer." An example of a screen-type protector is shown in a 1932 U.S. patent (U.S. Pat. No. 1,890,130) to Scardina entitled "Headlight Lens Protector." An example of a plastic, transparent cover for a vehicle light is shown in U.S. Pat. No. 3,290,497 which issued in 1966 to Ragle et al. entitled "Headlight Protector." A characteristic of all of these protectors is that they are designed to protect headlights and they are very specific in their size, shape or mounting configuration. That is, they have been designed for direct mounting to some portion of a very specific vehicle headlight; therefore, these protectors would not normally be categorized as "universal," in the sense that they could readily be attached to lights of a variety of shapes.

It is also known that lighting systems for some automobiles and nearly all trucks often include recessed lamps that are mounted behind portions of the vehicle body, e.g., a bumper, to provide secondary lighting on one or more sides of the vehicle. For example, it has become common practice to provide pairs of auxiliary driving lights behind cutouts in the front bumpers of heavy trucks. Because of their close proximity to the roadway surface, these low-mount lights are particularly susceptible to damage from the impact of roadway debris. To protect these and other recessed lights, essentially transparent (i.e., clear) lens protectors have been fastened to the bumper cutouts of some trucks. Lens protectors are available from RoVi Tooling & Plastics, Inc. of Fort Worth, Texas for a few specific trucks.

Transparent plastic protectors for some recessed truck lights have been carefully crafted by RoVi to match the cutouts in original equipment (i.e., O.E.M.) bumpers. Such protectors are injection molded of plastic to provide a generally planar shield portion in combination with two or more integral wedges or retainers. The retainers are integrally formed with the shield in order to dependably and repeatedly match the cutout dimensions and the thicknesses of the bumper or other body component. Such one-piece shields have just enough flexibility in their planar portions so that a modest bending moment can be applied to temporarily distend such portions in order that the fixed retainers may be inserted behind the bumper cutout; when correctly positioned, the shields will snap into place. Once the shield is properly positioned, the retainers assure a snug fit to prevent loosening of the shield under normal operating conditions.

Those who have had any significant experience with the vehicle after-market business will recognize, however, that replacement components for vehicle body parts—such as bumpers—are not always formed to the same specifications as original equipment parts. In some cases, tolerances on replacement bumpers for trucks vary so substantially from original specifications that lens protectors which are sized to match the cutouts in O.E.M. bumpers cannot be installed in the cutouts of replacement bumpers. One reason for this disparity between "factory original" and replacement bumpers may be that original bumpers are often stamped from coiled steel using huge presses in such a way that every bumper is identically sized and the location of every cutout is tightly controlled. On the other hand, replacement bumpers may be made with much less expensive equipment, and a simple oxyacetylene torch may be used to cut spaced openings for auxiliary driving lights. Those skilled in the art will appreciate that traditional cutting torches just cannot maintain the kinds of tolerances that are obtained with dies and presses. Experience has shown that the width of a seven-inch cutout in a replacement bumper can vary from one product to the next by as much as one-eighth inch. Such variations in hole dimensions render the proper fitting of snap-on protectors into replacement body parts difficult if not impossible. But even if it could be physically done, it would be so costly as to be impractical to fabricate and stock an individual lens protector that is uniquely sized to fit each replacement part for an original equipment component.

Another thing that is beginning to manifest itself in the field of light shields is the recent trend to utilize high-strength, low-weight plastics as a material for replacement bumpers and fenders, especially bumpers that are designed for heavy-duty tractors of the type associated with 18-wheel rigs. Besides their lower weight, such plastic bumpers are significantly different from the steel bumpers that they replace in that their thicknesses are not uniform, either from part to part or within a single part. In fact, a plastic bumper may vary in thickness by as much as 3/16 inch from one end of a cutout to its other end that is only a few inches away. As a result of the aforementioned size disparities—which is an old problem with regard to all bumpers, and the variation in part thickness across a plastic part—which is a new problem, it is difficult to furnish lens shields as an aftermarket item for the purpose of protecting vehicle lights that are recessed behind body parts like bumpers. The present invention is designed to solve these problems by providing what may fairly be called an essentially universal shield for recessed vehicular lighting, so that a single shield of a given size can easily be installed in the cutouts of replacement body parts as well as in original "factory" (or O.E.M.) parts.

Just in case there might be any doubt about why anyone should care whether their auxiliary vehicles lights are protected from damage by flying gravel and the like, a quick trip to a vehicle parts store to check on the current prices for replacement lights should make an instant believer of any skeptic who questions the wisdom of trying to protect a light from damage instead of just replacing it when it becomes broken. And many persons who are responsible for the maintenance of interstate trucks could probably verify that it is not uncommon to have to replace one or more auxiliary driving lights after only a week of cross-country driving. Also, there are some states which do not allow large trucks to have anything other than "white" driving lights that are visible on the front of their trucks. Other states permit amber lights as auxiliary driving lights. In those states where amber lights are permissible, it would be particularly advantageous to change the apparent color of a light by placing an amber lens over a "white" light—and then easily switch back again when fog, rain or snow no longer make amber lights desirable. A driver who has both clear and amber lens shields for his driving lights can then enjoy the protection that is afforded by such shields, plus the opportunity to switch the apparent color of his or her lights at will, with both benefits being available on the road without the hassle of having to install and adjust the alignment of a recessed light.

These and other advantages will be apparent from a reading of the specification and the claims attached thereto, as well as reference to the figures of the drawing provided herewith.

DESCRIPTION OF THE FIGURES OF THE DRAWING

In the several figures, like reference characters are used to designate like or corresponding parts, in order that continuity of the inventive concept will be more readily apparent in the several embodiments of the invention.

BRIEF DESCRIPTION OF THE INVENTION

Figure 1:
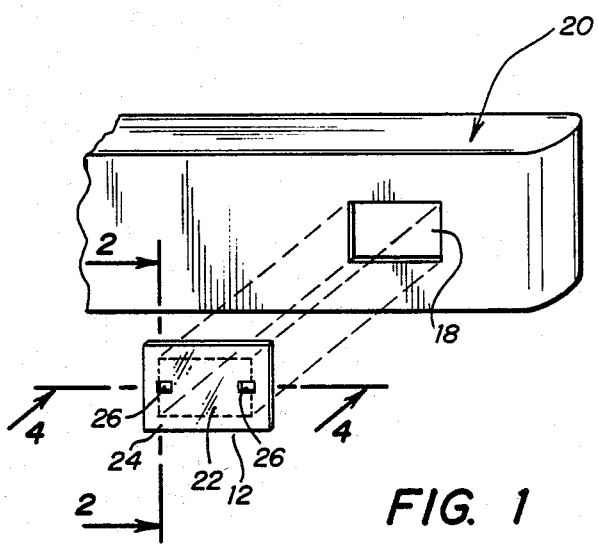
FIG. 1 is a partial perspective view illustrating relationships between the lens shield assembly and an exemplary cutout in a vehicle body portion, the cutout being rectangular and the vehicle body portion being a bumper.

A lens shield assembly according to the present invention protects recessed vehicular lights, especially lights of the type that are mounted behind a cutout in an automotive body—from gravel and other roadway debris. The assembly includes a protective plate which is positionable against the outer surface of a vehicle part, e.g., a bumper or fender, to cover an opening in the vehicle part. In a conventional manner, a light is permanently mounted behind the part opening so that radiated light shines through the opening. The plate includes a relatively large inner region which is approximately the same size as the part opening; this inner region should be essentially transparent, in order that it will transmit at least most of the radiant energy from the recessed light. The plate also includes a more narrow outer region which may also be transparent; but the outer region could be opaque, because it will normally overlie a solid (and opaque) portion of the vehicle part. Manufacturing simplicity usually dictates that both the inner and outer regions be of the same material, so both regions will usually be essentially transparent. The plate has at least a first opening near one of its sides, said opening extending transversely from an outer region of the plate toward, and preferably slightly into, the inner region. On the opposite side of the plate, a first retaining member is attachable or fixedly secured to the rear face of the plate and near its outer region, for the purpose of securing that one side of the plate to the vehicle's part.

A movable clip is attachable to the outer region of the plate for sliding engagement along an edge portion of the first plate opening; like the first retaining member, the clip extends rearwardly from the rear face of the plate. The clip can be manually positioned both transversely and longitudinally with respect to the plate, and it is restrained against rotation as it is moved between its inward and outward positions. When a portion of the clip is pushed behind an edge of the part opening and then pulled forward, that clip portion may be caused to bear against the rear surface of that portion of the part which borders the opening. In this manner the vehicle part may be securely captured between the plate and the clip. The preferred manner of accomplishing this "capturing" function is by providing a manually operable fastener, such as a screw, which passes through the first plate opening from the front to the rear of the plate. The head of the preferred fastener is accessible from the front of the part, and the clip is restrained against rotation as torque is applied to the fastener. Engagement between the clip and the part may thereby be effected solely from the front of the vehicle part, and a driver does not have to be able to reach behind the part in order to restrain some nut against rotation as the fastener is tightened and the clamping action of the clip is completed. By properly positioning both the retaining member and the clip at opposite ends of the part opening, the plate will be prevented from pulling away from the part opening, and at least the front of the recessed light will be protected from contact with errant bodies. At any time, however, the fastener may be loosened to the extent that the clip may be moved sidewardly (i.e., inwardly with respect to the periphery of the plate) until the rear portion of the clip will clear the adjacent edge of the opening—and the protective plate can be pulled longitudinally forward and away from the part and the recessed light.

If desired, the first retaining member can be configured in the same manner as the movable clip, so that both the recited retaining member and the clip are capable of being translated—sideways—with respect to the plate. In such an embodiment, there will be two inwardly extending slots or openings, each being on a respective side of the plate. And such a plate will normally be symmetrical about a vertical centerline, with one side of the plate being a mirror image of the other. Such an embodiment can be particularly useful when attaching the plate to a plastic (and non-uniform) bumper or the like, because each of the clips can be individually tightened to achieve the desired clamping action, even if one clip is significantly more rearward than the other—with respect to the plane in which the plate lies.

DETAILED DESCRIPTION OF THE PREFERRED EMBODIMENTS

Figure 2:
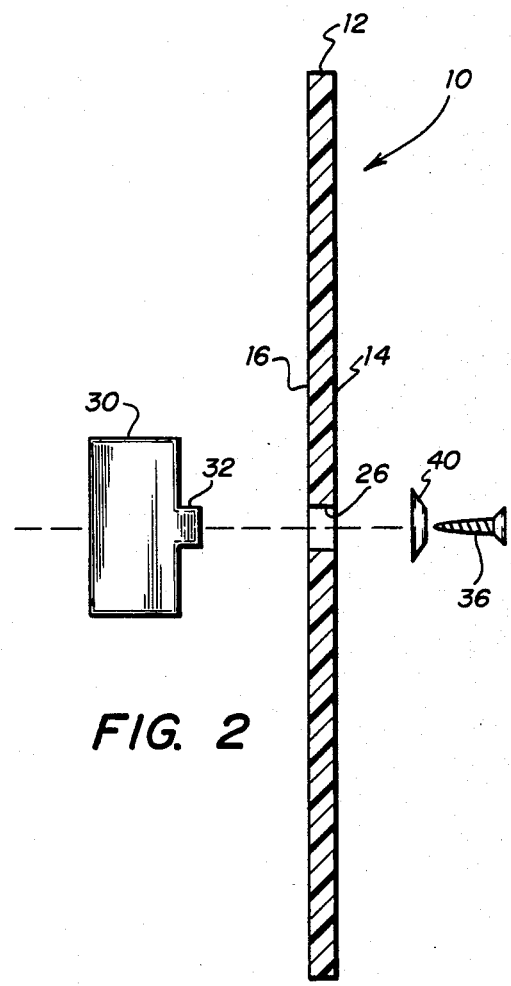
FIG. 2 is an exploded, cross-sectional view of the lens shield assembly taken in the plane represented by the lines 2—2 of FIG. 1.

FIGS. 1 and 2, respectively, provide perspective and cross-sectional views of a preferred embodiment of the lens shield assembly 10 in accordance with the invention. The assembly 10 comprises a protective plate 12 having a forward face 14 and a rear face 16, with the terms "forward" and "rearward" being naturally used so as to be compatible with the front and the rear of the vehicle to which the assembly is to be attached. The plate 12 is of a shape that is similar to, but of somewhat larger size than, an exemplary rectangular cutout 18 of a vehicle bumper 20. For large trucks and certain off-road vehicles, etc., auxiliary driving lights (not illustrated) are typically housed behind a pair of such body cutouts 18. A suitable thickness for the plate 12 is about one-eighth inch. For manufacturing simplicity, the entire plate 12 is preferably formed of a transparent polycarbonate plastic or similar strong—but slightly resilient—material. The term "transparent," as used herein with reference to the optical properties of the plate 12, is intended to mean only that the plate is not opaque. Thus, the plate 12 may be translucent and have, for example, refractive or dispersive properties. The plate 12 may be clear or of various colors; if a color such as amber is selected, back lighting the plate will provide the effect of a fog light; or red may be selected to conform with lighting requirements for the rear of a vehicle.

When the assembly 10 is installed, a peripheral portion of the rear face 16 fits against the front (i.e., the exterior) surface of the bumper 20, so that an inner plate region 22 overlies the cutout 18. A peripheral band or outer region 24 of the plate 12 covers the bumper material around the cutout.

A pair of elongated and closed slots 26, each being symmetrically positioned along an opposing side of the peripheral region 24, extend inwardly toward and preferably slightly into the inner region 22. As illustrated in FIG. 2, a retaining clip 30 is attachable to the plate 12 for sliding engagement along the slot 26. The co-linear orientation of the two slots 26 as shown in FIG. 1 provides an optimum adjustment capability—to compensate for the dimensional variations in cutout widths that are prevalent in after-market body parts. If the co-planar slots 26 are made relatively long, the extent of size adjustment that is made possible by the relatively movable clips 30 will be great. On the other hand, making the slots 26 too long will cause them to encroach so far into the inner region 22 that they can interfere with the light that is projected in front of the vehicle. A slot length of about ½ to ⅝ inch is believed to be a suitable compromise between adequate size adjustment (to fit body cutouts of various widths) and good light transmission. A slot width of about ¼ inch has been found to be a suitable width.

Figure 3:
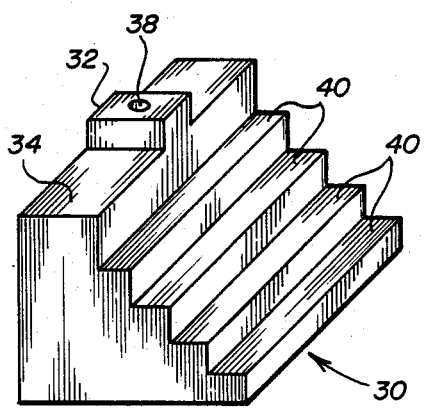
FIG. 3 is a perspective illustration of a molded plastic clip which forms an adjustable portion of the lens shield assembly.

Referring next to FIG. 3, each clip 30 includes a shoulder portion 32 having a width just slightly less than the width of a slot 26, so that an associated slot serves as a track for restricting and guiding the motion of the shoulder and hence the clip. A height of at least 0.08 inch is recommended for the shoulder portion 32, to assure reliable sliding engagement of the clip 30 along the slot 26 during installation of the assembly 10 on a body part. The retaining clips 30 are fastenable to the plate 12 with screws 36 which pass through the slots 26 and into threaded bores 38 formed in the shoulder portions 32. A washer 40 is positioned between the head of each screw 36 and the forward face of plate 12. The diameter of each washer 40, preferably a finish washer, is large enough to prevent the head of its associated screw 36 from passing through the slot 26, with the result that a clip 30 may be securely held to the plate 12 by turning its screw until the clip is fully drawn toward the plate 12. A washer diameter of about 7/16 inch has been found to be adequate when the slot width is about ¼ inch.

Figure 4:
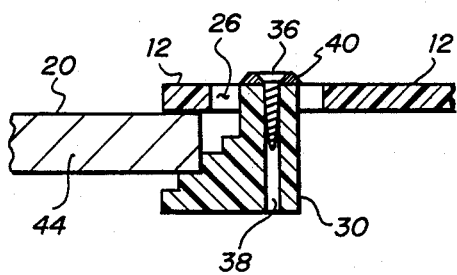
FIG. 4 illustrates an installed lens shield assembly as it would be viewed in partial cross-section in the plane indicated by lines 4—4 of FIG. 1.

In this preferred embodiment, the retaining clips 30 are formed with a generally rectangular pattern of elongated steps 40. The steps 40 form a series of contacting surfaces, one of which is likely to be just about right for positioning the clip against an edge portion 44 of the bumper (bordering the cutout 18), as shown in FIG. 4. A suitable height and depth of the plurality of steps 40 is about 0.08 inch. When four such steps are provided, the clip 30 can accommodate a variation in bumper thickness of over one-quarter of an inch without suffering any degradation in holding ability.

When a clip 30 is loosely coupled to the plate 12 with a fastening screw 36, the clip is usually moved toward the center of the plate as far as it will go, so that there will be no chance of interference with the bumper edge as the plate is pushed firmly against the outer surface of the bumper. With the plate held in position with respect to the cutout, the clip 30 is then gently moved outward until the particular step 40 that most closely matches the bumper thickness is positioned over the bumper edge 44. As the associated screw 36 is turned clockwise, the clip 30 will rotate ever so slightly until whatever slack exists between the shoulder 32 and the slot 26 has been taken up. Continued rotation of screw 36 will be resisted by interference between the square shoulder 32 and a structural part of the plate, namely, slot 26, with the result that the clip 30 will then be pulled toward the plate 12 until its top surface 34 bears against the rear face of the plate. Of course, the bumper edge 44 will be captured between the plate 12 and one of the several steps 40, and the arrangement becomes secure.

It is perhaps worthy of mention that the tightening sequence just described is the preferred sequence, because selecting a step 40 that causes the clip top 34 to bear directly against the rear of the plate 12 will usually leave the bumper edge 44 captured but not compressed between two parts of the assembly 10. What this means in practice is that a loosely captured metal bumper can expand on a hot summer day without putting any temporary stress on the fastener 36, because the bumper edge 44 is essentially free-floating between the two parts 12, 30. Both of the parts 12, 30 can then be dependably molded of a plastic material whose strength is certainly adequate but perhaps not as great as that of steel; and there is no risk that the fastener will become loosened or that threads will become stripped as a result of repeated swelling and contracting of a captured bumper that is more sensitive to temperature changes than are the plastic parts. But while the spatial relationship just described is preferred, it is not critical; so if a driver should inadvertently place a particular step 40 next to the bumper edge 44 so that the bumper edge is "squeezed" between the parts 12, 30 when the fastener is tightened, no immediate harm will be done. A prudent thing to do, though, is to periodically check the tightness of the fasteners 36—unless it is certain that a step 40 has been chosen which will not permit any temperature expansion or flexure of a bumper to put stress on the fasteners. Checking the fasteners for tightness every few months may therefore be a good practice.

The preferred method for installing the assembly 10 over a recessed lighting cutout 18 begins with selecting the proper size of transparent plate 12, which should be slightly larger than the cutout dimensions. A peripheral outer region 24 approximately one-half inch wide is about right; so if a bumper cutout is about seven inches wide, then a plate 12 about eight inches wide should probably be selected. Two retaining clips 30 are connected to the plate with washers 40 and fasteners 36 which pass through the plate slots 26, with the result that the clips extend rearwardly from the rear face 16 of the plate 12. A final confirmation that the correct plate size has been selected will be to ensure that both clips 30 can be moved close enough together to permit the plate 12 to be pushed into confronting relationship with the cutout 18. If the width of the cutout 18 is so small that there is not enough clearance to permit the clips 30 to pass through, then a slightly smaller plate 12 must be selected. Of course, both clips 30 do not have to be pushed through the cutout simultaneously; it is possible to push a first clip through the cutout 18 and then move the entire assembly 10 in the direction of that first clip—to create enough clearance so that the second clip can also pass through the opening.

Figure 5:
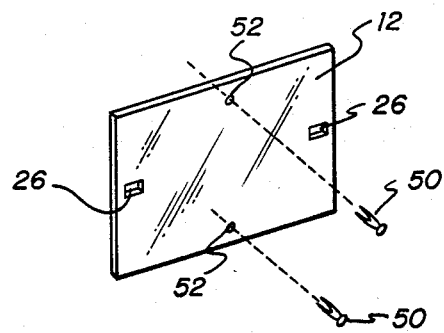
FIG. 5 illustrates optional plugs or pins which may be included in a lens shield assembly to provide protuberances that assist in locating the lens shield vertically with respect to a cutout.

Because a slightly loose fit between the plate 12 and the cutout 18 is preferred, it will be advantageous to provide some protuberance which operates as a means for preventing the plate from falling down to a relatively low position with respect to the cutout. If the plate is absolutely flat on its back face 16, as shown in FIG. 2, it will be useful to insert one or more plugs or expandable pins 50 through additional holes 52 in the plate (as shown in FIG. 5) to serve as vertical stops against the bumper edge portion 44. Of course, only the bottom plug 50 is likely to bear against an edge of the bumper opening 18; so the top plug is really superfluous in this particular embodiment. But putting two fixed plugs 50 in the plate 12 will render the plate immune to any particular up/down orientation as it is installed over a cutout 18; that is, a plate can be installed "right side up" or "upside down" when it is symmetrical about both a vertical and a horizontal axis.

An alternative way of helping to manually position a rectangular plate 12, vertically, with respect to a generally rectangular cutout 18 is to create the plate with injection molding techniques and incorporate a built-in protruding lip on the rear face of the plate—at about the same elevation that a plug 50 would extend out of the back of the plate. Such a protruding lip could be continuous or it could be a series of aligned fragments; a suitable height for such an integrally molded lip would be about ⅛ inch. In view of the description herein, it should now be obvious that such a protruding lip would be useful in locating the plate 12 during installation; and such a lip would also help prevent unwanted vertical movement of the plate during road travel, when a bumper might be subject to sufficient vibration as to introduce unwanted dynamic loads on the assembly 10.

Next, the plate 12 is manually positioned over the cutout 18 such that the retaining clips extend into the cutout 18, until the peripheral region 24 of the plate contacts the vehicle body member (e.g., a bumper 20) along the border of the cutout. The oppositely oriented clips 30 are then moved in opposite directions along the plate slots 26 to their outward positions, so that the forward face of each clip eventually contacts an edge portion 44 of the cutout 18. The fastening screws 36 are then turned clockwise to draw the clips 30 toward the plate, thereby securing the assembly 10 to the vehicle body member. It should be noted that when the clips 30 slide along the slots 26, and when the fastening screws 36 are turned, rotation of the clips is prevented by the mating relationship between each clip shoulder 32 and a corresponding slot 26. But if this mating relationship is not believed to be enough—from an engineering point of view, an upstanding lip can be molded into the plate 12, parallel to the slot 26, to provide some side support and hence more resistance against rotation of clip 30 as a fastener is tightened.

If a first polycarbonate shield should ever become damaged by impact with an immovable object, or if a driver wished to change the color of the radiation that is projected by a recessed light, the first shield could be removed from its installed position on a vehicle with the same speed and efficiency with which it was installed. And a replacement shield of the same or a different color could be immediately put back on the vehicle. Or, a shield could be permanently removed from the vehicle without leaving behind any trace that would reveal that it had ever been installed. Both the installation and removal of the shield assembly may therefore be accurately described as being very "clean."

ADVANTAGES AND MODIFICATIONS OF THE INVENTION

One feature of the lens shield assembly 10 is that it is adjustable to accommodate the wide variations in dimensions and thickness that are prevalent among aftermarket body parts. Another feature is that installation of the assembly 10 can be fully effected without inserting any tools or hands behind the vehicle surface, e.g., the bumper 20. That is, the fastening screw 36 is completely accessible from the front side 14 of the plate 12, so one person can conveniently secure the plate over the cutout 18 with a simple screwdriver. If theft should ever begin to become a problem with the light shields disclosed herein, a switch to high-security fasteners (instead of simple sheet-metal screws) would render the shields immune to theft; but authorized personnel could still install and remove the shields in a matter of seconds with the proper wrench.

Another feature of the preferred embodiment is that the retaining clip 30 may be freely moved along the slot 26, while the integral shoulder portion 32 (which is in sliding engagement with the slot) prevents the clip 30 from rotating. Thus, as torque is applied to turn the screw 36, the orientation between the edge portion 44 and an associated clip is never altered. So even if a driver cannot see the orientation of the clip 30 behind the plate 12, he or she will know that the clip is correctly oriented to do its intended job just as soon as it has been properly located adjacent the edge of the cutout.

Also, once the assembly 10 has been put together by trapping the clips 30 so that they move only in the slots 26, it is then and forever a complete assembly—and there are no loose parts (like nuts) that can be dropped in the snow or mud in front of the bumper and lost. A driver can therefore install or remove the lens shields with gloves on both hands, and not have to worry about establishing a threaded engagement between, say, a bolt and a loose nut. And once the basic threaded connection between screw 36 and bore 38 has been made, they need never be separated again; so there is essentially no risk that any threads on the shank of screw 36 could become exposed where they might be damaged so as to render a clip inoperative.

Furthermore, a bumper 20 need not be rigidly clamped against the clips 30 in order to lock the plate 12 in place. Rather, the discrete steps 40 permit the clips 30 and plate 12 to be secured about the bumper edge portion 44 without requiring tight or intimate contact between the parts. Therefore, if the bumper experiences bending moments from coming into contact with an obstacle such as a concrete post or even a loading dock, the loose fit of the assembly 10 with respect to the cutout 18 permits at least some movement of the assembly—to minimize stresses and avoid breakage of either the plate or the clips.

Also, the preferred embodiment of the invention features a pair of clips 30 which are adapted for sliding engagement in plate slots 26; but it would also be possible to substitute a non-adjustable retaining member for one of the movable clips 30. Such a non-adjustable retainer at one side of the plate 12 would likely have a distal end that is shaped much like one of the adjustable clips. Of course, such a retainer would protrude out of the back of the assembly and would be permenently affixed to the rear face of the plate. The other side of the plate would still have its adjustable clip 30, because at least one slideably adjustable retaining device is believed to be the minimum requirement in order to obtain the benefits of the inventive concept disclosed herein.

Figure 6:
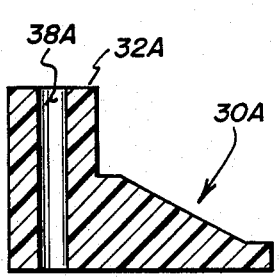
FIGS. 6 and 7 illustrate alternate embodiments for clips which are useful in compensating for body parts with irregular thicknesses.
Figure 7:
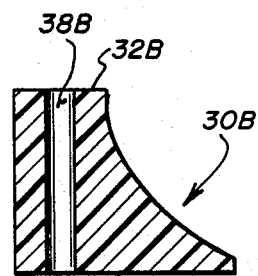

To accommodate metal bumpers having thicknesses which deviate materially from original equipment tolerances, the contacting surface of a clip may be of a tapered or arcuate shape, as illustrated in FIGS. 6 and 7, instead of comprising discrete steps. And although the shoulder portion 32 fits snugly in a slot 26 to prevent rotation of the clip 30, this feature may not be necessary for the installation of some step-shaped clips. This is because the steps 40 which mate with the bumper edge portion 44 can provide at least some resistance to rotation of the clip, if the steps are relatively long. A length of approximately one inch to about 1.25 inches is believed to be appropriate for providing the minimum desirable range of contact between a step 40 and a cutout edge.

Figure 8:
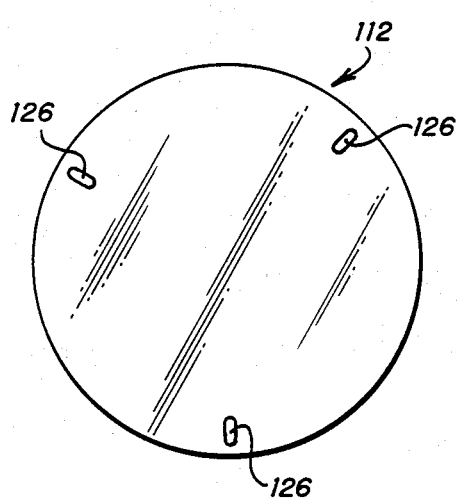
FIGS. 8 and 9 illustrate exemplary designs for a round plate which is adapted to cover a round cutout, as well as clips of an alternate design which would be useful in connecting a round plate to such a cutout.
Figure 9:
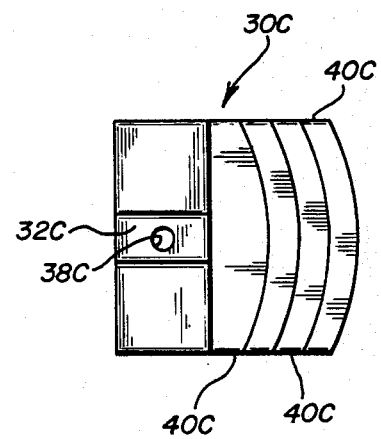

The invention is, of course, suitable for cutouts of varied shapes. By way of example, FIG. 8 illustrates a circular plate 112 that is adapted to be positioned over a circular vehicle body cutout which is slightly smaller in diameter than the plate. In this embodient the generally planar member 112 includes three slots 126 radiating inwardly from near the periphery, towards the center of the member. These radial slots 126 are separated by angles of at least 90 degrees, and preferably 120 degrees. The slots 126 may be configured very simply, with straight and generally smooth walls like those shown in FIG. 5. Their effectiveness as torque-resisting elements may be enhanced by combining them with parallel ridges or grooves—to increase the ability of the plate to resist torque as a fastener is tightened. For curved bumper cutouts, the clips 30C (FIG. 9) may be formed with complementary curved steps 40C, for placement against the cutout border. The clips for the plate 112 could also have a contact surface (on its forward face) that is tapered, as illustrated by the clip 30A in FIG. 6. Such a clip has a relatively thin distal edge and a relatively thick proximate edge near the fastener; the contact surface between these two edges is therefore inclined. Alternatively, the clips may have an arcuate shape, as illustrated by the clip 30B in FIG. 7.

It should be appreciated by those skilled in the art that certain preferred embodiments have been discussed in great detail herein, but these are intended to be merely exemplary of the broad scope of the invention. Furthermore, the specific materials, dimensions and shapes disclosed herein are intended to fully disclose the inventive concept by illustrating ways in which the invention may be practiced. But by virtue of disclosing the preferred embodiments and certain exemplary modifications, it is not intended to limit the scope of the invention. The invention should therefore be understood to be defined only by the claims appended hereto, and, of course their reasonable equivalents.

What is claimed is:

1. A lens shield assembly for protecting recessed automotive lights—such as the type mounted behind a cutout in a vehicle body—from impact with stones and other road debris which might be thrown into the air by a truck or the like, said assembly comprising:
    (a) a protective plate having a peripheral region and an inner region, the plate being positionable against an outer vehicle surface to cover a cutout in the vehical surface behind which a light is recessed, and the inner region being esesntially transparent, the plate including at least a first opening which extends between a front and rear face of the plate and from the peripheral region toward the inner region.
    (b) a first retaining member being manually positionable through the cutout in the vehicle surface to secure the plate to the vehicle surface;
    (c) a clip attachable to the rear face of the plate near the peripheral region thereof for sliding engagement along an edge portion of the first plate opening, said clip including a surface for contacting a portion of the vehicle surface bordering the cutout to secure said assembly to the vehicle surface; and
    (d) a fastener positionable through the first plate opening to couple the plate to said clip, and said sliding engagement of the clip and securement of the assembly being effected by coupling said clip with the fastener.

2. The assembly as claimed in claim 1 and further including means for limiting rotation of said clip with respect to the outer vehicle surface when said clip is positioned for sliding engagement with the plate.

3. The assembly as claimed in claim 2 wherein the first opening in the plate is a closed slot of pre-determined width, and said means for limiting rotation of the clip comprises a shoulder which is integrally formed on said clip for positioning the clip in the slot, said shoulder having a width slightly less than the width of the slot, and the shoulder having a configuration other than round.

4. The assembly as claimed in claim 3 wherein the fastener is a screw that is sized to mate with a threaded bore in the shoulder, and wherein securement of the assembly to the vehicle surface is effected by threading the screw into the bore so as to move the clip toward the plate until the clip is no longer movable with respect to the cutout.

5. The assembly as claimed in claim 1 wherein the clip surface which contacts the vehicle surface bordering the cutout has a configuration selected from the group including discrete steps, an inclined surface and an arcuate shape.

6. The assembly as claimed in claim 1 and further including a second opening in the plate which extends from the peripheral region into the inner region, and wherein the first retaining member is attachable to the plate for sliding engagement along the second plate opening, and said first retaining member has a contact surface which is positionable against a second portion of the vehicle surface which borders the cutout, and wherein the first retaining member and the clip are positioned at parts of the plate that are remote from each other.

7. A lens shield assembly adapted to be affixed to the exterior of the bumper of a wheeled vehicle, for protecting the lens of a light from damage as a result of being struck by flying rocks or other projectiles as the vehicle is driven along a road, comprising:
   (a) a generally planar and essentially transparent member having a size slightly larger than a bumper opening behind which a vehicle light is installed, and said planar member having at least one slot which extends radially inward from a location near one edge of the planar member, and said slot having a generally uniform width;
   (b) a first retaining member secured to the rear face of the planar member, said retaining member being located on that side of the planar member which is opposite said at least one slot, and the retaining member having a configuration which permits an edge portion of the bumper—around the bumper opening—to be firmly captured between the retaining member and the planar member;
   (c) a movable retaining clip adapted for mating with said at least one slot so as to be slideable along the length of said slot;
   (d) means for preventing rotation of said retaining clip with respect to said at least one slot in the planar member, whereby the retaining clip may be freely moved along the slot while maintaining its spatial orientation with respect to the slot, and whereby rotation of the retaining clip with respect to the slot is precluded as torque is applied to the retaining clip by a fastener that is being tightened; and
   (e) a fastener associated with the retaining clip, said fastener being accessible from the front of the bumper in order to be manually tightenable so as draw the retaining clip toward the bumper and capture an edge portion of the bumper between the planar member and the associated retaining clip.

8. The lens shield assembly as claimed in claim 1 wherein said means for preventing rotation of the retaining clip constitutes a non-round shoulder which is integrally formed with the retaining clip, and the shoulder having a width that is just slightly less than the width of the slot.

9. The lens shield assembly as claimed in claim 7 wherein said fastening member constitutes a screw which is oriented so that its head is in front of the bumper and its threaded shank extends into a bore within the retaining clip that is behind the bumper, whereby the retaining clip may be moved forward with respect to the bumper by manually threading the screw into the retaining clip.

10. The lens shield assembly as claimed in claim 7 wherein said first retaining member is adjustable in position with respect to the planar member by moving it in the same plane in which the retaining clip is movable.

11. The lens shield assembly as claimed in claim 7 wherein the first retaining member is movable in a second slot in the same manner as the retaining clip, and the second slot is on the opposite side of the planar member from said first-named slot.

12. The lens shield assembly as claimed in claim 7 and further including at least one fixed protuberance extending rearwardly from the rear face of the planar member for assisting in correctly positioning the planar member with respect to the bumper opening before the fastener is tightened.

13. The lens shield assembly as claimed in claim 7 wherein the forward face of the retaining clip is formed of a series of discrete steps, whereby bumpers of different thicknesses may be accommodated by selecting an appropriate one of the discrete steps to be juxtaposed with the bumper edge as the fastener is tightened.

14. The lens shield assembly as claimed in claim 7 wherein the forward face of the retaining clip is inclined from a thin distal edge to a thick proximate edge near the fastener, whereby bumpes that deviate in thickness from a nominal size can be accommodated by pushing the retaining clip outward until its inclined forward face makes contact with the rear edge of the bumper opening.

15. The lens shield assembly as claimed in claim 7 wherein the generally planar member is approximately rectangular and it has two slots which extend inwardly from opposite sides of said member, and wherein both the first retaining member and the movable retaining clip are configured identically but they are connected to the planar member so that they are oriented oppositely.

16. The lens shield assembly as claimed in claim 7 wherein the generally planar member is generally round, and it has three slots which extend radially inward from three widely separated locations near the periphery of the planar member, and said radial slots are separated by angles of at least 90 degrees.

17. The lens shield assembly as claimed in claim 16 wherein the three radial slots are respectively separated by approximately 120 degrees.

18. The lens shield assembly as claimed in claim 7 wherein the first retaining member and the movable retaining clip are identically configured, and they both are movable in slots having a length of about one-half inch, whereby the lens shield can be affixed over either of two bumper openings where widths differ by almost as much as one inch.

19. The method of covering an opening in a vehicle bumper with an essentially transparent and planar member, the planar member being relatively firm so as to be self-supporting, comprising the steps of:

(a) placing the planar member over the front of the bumper opening, and the size of the planar member being slightly larger the the bumper opening, such that a band of the planar member material will overlap the edge around the bumper opening;

(b) providing at least one movable retaining clip near the periphery of the planar member, said retaining clip being movable between an inward position at which it will pass through the bumper opening and an outward position at which it will not pass through the bumper opening, and said at least one movable retaining clip cooperating with another element in generally the same plane to secure the planar member over the bumper opening when the retaining clip is in its outward position;

(c) restraining said at least one retaining clip against rotation as it is moved between its inward and outward positions; and (d) restraining said at least one retaining clip against rotation while torque is applied thereto during the process of securing a mechanical fastener to the retaining clip after the clip has been positioned so as to hold the planar member in a desired position with respect to the bumper opening.

20. The method as claimed in claim 19 including the step of providing two movable retaining clips near the periphery of the planar member, with one of the retaining clips being located at each of the two sides of the planar member, such that the retaining clips are movable in opposite directions to reach their outward positions.

21. The method as claimed in claim 19 wherein said at least one retaining clip is restrained against rotation by providing the retaining clip with a generally square shoulder that is sized to move within a slot having generally flat and smooth walls.

22. The method as claimed in claim 19 wherein said at least one retaining clip is restrained against rotation while torque is applied thereto by providing the retaining clip with a shoulder that is sized and configured to bear against a structural part of the planar member, and said shoulder having at least a major portion that is generally perpendicular to a plane that passes centrally through the planar member.

23. A method for covering a recessed lighting cutout in a vehicle body member such as a bumper to protect a lamp or lens from impact with airborne gravel, stone, and other debris, the method comprising the steps of:

(a) forming a plate slightly larger than the cutout dimensions and extending a retaining member outward from the rear face of the plate;

(b) providing an opening in the plate which extends inwardly along the plate from a peripheral region of the plate, the opening being sized to receive a retaining clip for sliding engagement;

(c) connecting a retaining clip to the plate with a fastener that passes through the plate opening such that the clip extends outwardly from the rear face of the plate;

(d) positioning the plate over the cutout such that the retaining clip and retaining member extend into the cutout, and the peripheral region of the plate contacts the vehicle body member along the border of the cutout;

(e) positioning the retaining member against a first edge portion of the cutout; and (f) moving the clip along the plate opening to contact a second edge portion of the cutout, and clamping the clip against the second edge portion while said contact is maintained, thereby securing the plate against the vehicle body member.

24. The method claimed in claim 23 wherein movement of the clip along the plate opening is restricted to movement that does not involve rotation of the clip 25. The method as claimed in claim 23 wherein the clip is restrained from rotation when it is being clamped against the second edge portion of the cutout, and said restraint is effected by holding the clip against rotation with respect to the plate.

* * * * *